United States Patent [19]

Kushida

[11] E Re. 28,527

[45] Reissued Aug. 26, 1975

[54] WATCH CASE

[75] Inventor: Hachiro Kushida, Tokorozawa, Japan

[73] Assignee: Citizen Watch Co., Ltd., Tokyo, Japan

[22] Filed: Apr. 9, 1974

[21] Appl. No.: 459,433

Related U.S. Patent Documents

Reissue of:

[64] Patent No.: 3,726,082
Issued: Apr. 10, 1973
Appl. No.: 105,865
Filed: Jan. 12, 1971

[30] Foreign Application Priority Data

Jan. 13, 1970 Japan ..... 45-3641

[52] U.S. Cl. ..... 58/88 G
[51] Int. Cl. ..... G04b 37/00
[58] Field of Search ..... 58/88, 90 R, 106.5; 117/129, 135.1; 204/18, 23, 58

[56] References Cited

UNITED STATES PATENTS

| | | | |
|---|---|---|---|
| 2,102,630 | 12/1937 | Kreidl | 117/129 X |
| 2,672,426 | 3/1954 | Grubel et al. | 117/129 X |
| 3,248,234 | 4/1966 | Godron | 118/129 X |
| 3,482,951 | 12/1969 | Hubbell et al. | 117/129 X |
| 3,553,958 | 1/1971 | Grohoski | 58/91 |

FOREIGN PATENTS OR APPLICATIONS

| | | | |
|---|---|---|---|
| 3,079 | 3/1891 | Switzerland | 58/88 |

OTHER PUBLICATIONS

The Surface Treatment and Finishing of Aluminum and its Alloys by Wernick and Pinner; Pub. by Robert Draper Ltd., 1964, pp. 257–260, 337–349.

*Primary Examiner*—George H. Miller, Jr.
*Attorney, Agent, or Firm*—Sughrue, Rothwell, Mion, Zinn & Macpeak

[57] ABSTRACT

A watch case, with the exception of the non-metallic crystal, is predominately made from aluminum or an aluminum alloy upon which a thin layer of fine crystalline $\gamma AL_2O_3.H_2O$. The casing may also be subjected to a dyeing step and a crystal pore-filling step followed by a final polishing step.

6 Claims, 3 Drawing Figures

WATCH CASE

Matter enclosed in heavy brackets [ ] appears in the original patent but forms no part of this reissue specification; matter printed in italics indicates the additions made by reissue.

---

This invention relates to watch cases and in particular to wrist-watch cases having a fine and colorful appearance.

Most of all conventional metallic watch cases are mainly made of steel alloy, stainless steel or gold or the like precious metal. Steel alloy cases are frequently coated with a precious metal, chromium or the like coating for improving the anti-corrosion performance.

Stainless steel and alloy steel watch casings represent initially very beautiful metallic appearance which will be gradually lost or scratched during a prolonged use of the case, for instance, for 2 or 3 years of its practical usage, on account of a lower hardness of the material such as $H_v$ 200 or so. On the other hand, the protectingly coated steel alloy watch case may frequently be suffered from scale-off of the coating or pinhole formation, resulting in an early corrosion of the case material.

Watch cases made of gold, platinum or the like precious metal are naturally very high in their price which limits its practical usage.

Recently, there is such a strong trend that the wrist watches, especially those for gentlemen, are designed to larger sizes which represents such a drawback that a stabilized attachment of the watch on the wearer's moving wrist is very difficult on account of its heavy weight, since the specific weight of the conventional metal watch casing amounts generally to 7.8–8.5 g/cub. centimeter.

When the watch case is to be made of stainless steel, for instance, its machinability and press-formability are highly worse and its manufacturing process is substantially labor-consuming and costly, even when the accompanying limitation in the selectivity of watch case design has been neglected.

It should be noted further that conventional stainless steel or steel alloy-made watch cases are limited in its appearance to "white" metallic color and can not provide a colorful appearance which is highly favorable in pace with modern personal accessories.

It has been recently proposed to prepare watch cases for sintered metal carbide such as tungsten or titanium carbide for attaining superior scratch-proof effect. In this advanced and improved kind of watch cases, the manufacturing difficulty, heavy weight and monotone metallic appearance can not be avoided.

The main object of the present invention is to provide a light weight and practically scratch-proof watch case.

A further object is to provide a watch case of the above kind, capable of being manufactured in an easy way even on a mass-production base.

Still further object of the invention is to provide a watch case of the above kind which represents a non-metallic appearance.

A still further object of the invention is to provide a watch case of the above kind which represents a colorful appearance.

In order to fulfil the aforementioned object, the invention starts from such a watch case consisting of a plurality of detachable members, such as the middle, the bezel, the back cover and the like. In the meaning of the term "watch casing" as used throughout this specification, it includes all the at least partially exposed conventionally metallic parts including the winding stem, but excluding the non-metallic crystal. The watch case according to this invention is characterized by such that at least a member thereof comprises a base of a member selected from the group consisting of aluminum and aluminum alloy and a skin layer deposited thereon and comprising fine crystaline $\gamma$-$Al_2O_3H_2O$.

The thickness of the skin layer amounts generally to 5–100 microns, preferably 20–80 microns, and most preferably in the order of 50 microns. The fine crystaline $\gamma$-$Al_2O_3H_2O$ skin layer per se represents a non-metallic colorful appearance of mixed grey, brown and green. The formation of such fine crystaline hard skin layer can be carried into effect by subjecting the metal base prefabricated into a casing stock to an anodic oxidation step in an acid bath, using preferably sulfuric acid, oxalic acide or the like, or a mixture thereof, as will be described hereinafter more in detail. The colorful appearance will be further enhanced by subjecting the anodically oxidized products successively to a dyeing step and a crystal pore-filling step. A favorable glazing effect is obtained by subjecting to the final products to a polishing step.

The hardness of the skin layer amounts generally to $H_v$ 400–850. In practice, the skin layer consists substantially of $\gamma$-$Al_2O_3$ direct after completion of the anodic oxidizing step, which compound is however converted to $\gamma$-$Al_2O_3H_2O$ when subjected to the crystal pore-filling step, preferably steaming for about 30–60 minutes as an example.

The specific gravity of the watch case according to this invention is generally in the order of 2.7 g/cub. centimeter which amounts only to one-eighth of that of conventionally used stainless steel. This light weight nature of the watch case according to this invention improves substantially the desirous stabilized portableness of the watch on the wearer's wrist.

The manufacturing labor cost of the watch case according to this invention can be reduced to 1/2–1/5 of that of the conventional stainless steel cases on an industrial mass production base as ascertained by our practical records.

These and further objects, features and advantages of the invention will become more apparent when read the following detailed description of the invention by reference to the accompanying drawings.

Figure 1:
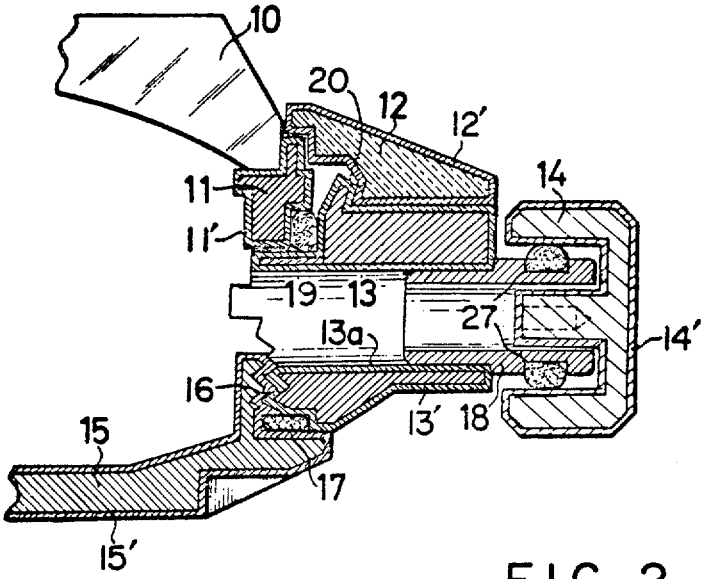
FIG. 1 is an axial section view of part of a watch case as first embodiment of the invention.

Referring now to FIG. 1, the first embodiment will be described in detail hereinbelow.

In this figure, numeral 10 represents a conventional crystal preferably made of optical glass. This crystal 10 is fixedly attached to a support ring 11 by glueing, although the glued joint therebetween has been omitted from the drawing for simplicity. This support ring 11 is made of 99.8 percent-pure aluminum or its alloy and formed with a skin surface 11' comprising substantially $\gamma$-$Al_2O_3H_2O$.

Numeral 12 represents a bezel mounting the crystal-support ring assembly 10;11, said bezel being made of pure aluminum or aluminum alloy and formed with a skin layer 12' of the similar nature as before.

Numeral 13 represents the middle or main casing member which is made of pure aluminum or aluminum alloy and formed with a skin layer 13' of the similar nature as before. This member 13 mounts the crystal-support ring assembly 10;11 and the bezel 12.

Numeral 14 represents a winding crown which is made of pure aluminum or aluminum alloy and formed with a skin surface 14' of the similar nature as before. The crown 14 is fixedly attached to the outer end of a conventional winding stem, not shown, and rotatably mounted on a conventional bearing tube 18 through a sealing ring 17, said tube being fixedly mounted in the bore 13a of said bezel 12.

Numeral 15 represents a rear or bottom cover which is made of pure aluminum or aluminum alloy and formed with a skin layer of the similar nature as before. This cover 15 is detachably attached to the main casing member 13 by means of a screw joint 16. For insuring a tight or water-proof connection between two members 13 and 15, there is provided an O-ring 17. A further O-ring 19 is provided between the two members 11 and 13 for serving in the similar way.

Since the coefficient of elasticity of pure aluminum of aluminum alloy amounts generally to 7,000–7,700 kg/sq. mm which is about 40 percent of that of stainless steel. Therefore, certain measures for the prevention of unintentional slipping-out of constituent parts such as crystal and the like from the watch assembly in case of an application of sudden shock which may take place when the watch is dropped on the floor, as an example. For this purpose, the crystal 10 has been glued to the support ring 11, as was referred to hereinbefore. The fixing means are not limited only thereto. Screwing, tongue-and-groove or the like connection can also be adopted when necessary.

Combination at 20 between the bezel 12 and the middle or main casing member 13 must be carefully done from the same reason. Engaging allowance at the connection 20 must be increased by 50–200 percent of the normal value as employed in the case of stainless steel-made watch cases. Engaging angle at the connection 20 should be increased to 50–300 percent more than the normally employed value and in the more acute sense. The height at the same connection place 20 should be increased by 50–100 percent of the normal value.

The screw connection at 16 between the middle 13 and the rear cover 15 must also be fabricated with carefulness. Threads connection in relation with the male as well as female threads must be rounded at their respective top crest and valley or bottom, although in the drawing the threads have been only schematically drawn as if they should have sharp crests and valleys. By adopting such measure, the skin layer can be formed on the whole area of the threaded region to have an even thickness during the anodizingly oxidizing step. Care must be taken not to provide sharp edges on the prefabricated watch case stock, because the $\gamma$-$Al_2O_3 \cdot H_2O$-crystals develop in the perpendicular direction to the surface of the mother material and the presence of sharp edge or valley will result in an absence of the crystal formation and a latter development of scale-off of the skin layer beginning from such non- or insufficiently anodized areas. This disadvantageous effect is rather predominant at the edge or crest and therefore the thread bottom, if necessary, may have regular shape.

Figure 2:
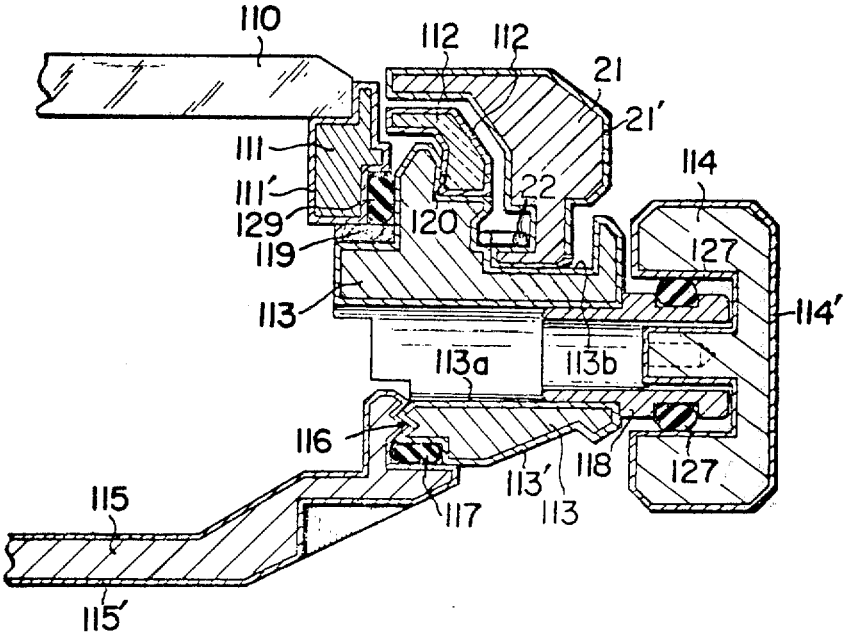
FIG. 2 is a similar view to FIG. 1, illustrating second embodiment.

Next, referring to FIGS. 2 and 3, the second embodiment of the invention will be described. In these figures, functionally same or similar constituent parts as before, irrespective of minor difference in the specific physical configuration, respective same reference numerals are employed, yet each being added with 100 for quicker identification and comparison.

In these figures, 110 represents the crystal and 111 denotes the support ring therefor, the both being fixedly attached by glueing or the like conventional fixing means. The skin layer of the ring 111 is shown at 111'.

The bezel and its skin layer are shown at 112 and 112', respectively.

The middle or main casing member and its skin layer are shown at 113 and 113', respectively. The winding crown and its skin surface are shown at 114 and 114', respectively. The middle 113 is formed similarly with a lateral opening for reception of the bearing tube 118 to be described. Numerals 115 and 115'; 116; 117; 118; 119 and 120 are of the respective same meaning as before. The mutual design and arrangements of these parts are also substantially similar as before.

Figure 3:
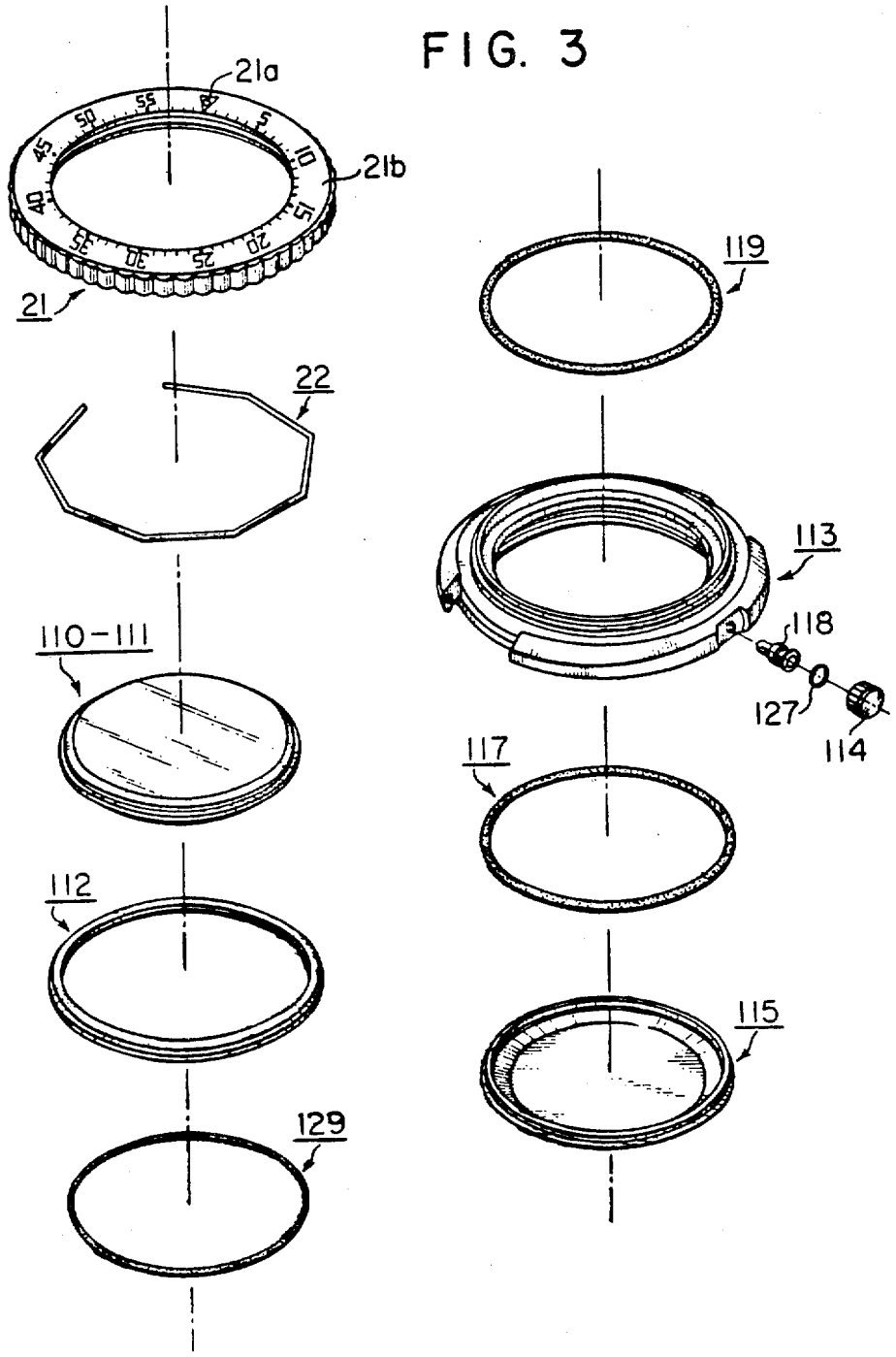
FIG. 3 is an exploded perspective view of several constituent parts of the watch case shown in FIG. 2.

Numeral 21 represents a register ring which is most clearly seen from FIG. 3. This ring bears an indicating mark 21a and a time-indicator gradation 21b. This ring is rotatably mounted on a ring groove 113b on a horizontal plane when seen in FIG. 2. An open ring wire spring 22 is inserted between the middle 113 and the ring 21 so as to prevent unintentional disengagement of the latter, and at the same time, to provide a certain frictional resistance to the rotatable ring 21.

This ring 21 is formed with a hard skin layer 21' the nature and characteristics of which are just same as before and provided for the same purpose.

For obtaining a more effective sealing between the crystal-support ring assembly 110;111 and the middle 113, a further sealing ring 129 is additionally provided to the O-ring 119. It will be easily seen that all the constituting parts shown in FIG. 3 may be assembled together, so as to provide a watch case with crystal as shown in FIG. 2.

As described briefly hereinbefore, provision of sharp edges on the exposed surface of the watch case assembly must be avoided as far as possible for increasing the scale-off resistance of the hard skin layer. A sharp edge, if formed on the stock case prefabricated in the moulding or pressing, machining, grinding and the like metallurgical and mechanical way must be rounded with a radius amounting preferably to 200–500 microns. This rounding or chamfering operation must be carried into effect preferably in advance of the anodizing step. The minimum thickness of any part of the case constituents must preferably be 800–1,000 microns in consideration of the more unfavorable mechanical strength of the pure aluminum or aluminum alloy employed for the manufacture of the watch case according to the invention than that of stainless steel stock conventionally used.

The invention can be understood more clearly by reading through a substantially sole numerical example for the manufacture of the watch case according to the invention and several performance tests to follow.

EXAMPLE

A 6 mm thick sheet stock of anticorrosive aluminum alloy, Class 1, J.I.S. (Japanese Industrial Standards) was prefabricated by pressing, cutting and grinding to the middle having the shape as shown at 13. There was no necessity for annealing in any way. On the contrary to the correspondingly shaped stainless steel watch case stock, at least four to seven annealing steps were necessary at 1,100° C or so. In this way, the manufacturing labor cost was reduced to about a half the conventional prefabrication one.

In the similar way, the bezel, the winding crown and the rear cover shown in FIG. 1 were prefabricated.

Next, these case parts were dipped in a 7 percent-aqueous caustic soda solution, 60° C, for about 1–2 minutes for degreasing.

Then, these parts were subjected to an anodized oxidation process under the following conditions:

Bath composition:
10 percent-sulfuric acid added with each 2–3 percent of oxalic acid and glycerin
Treating temperature:
from minus 3° C to plug 10° C
Treating period:
40 minutes
Current density:
2 amperes/cm$^2$
Thickness of skin layer:
30–50 microns These parts are used as per se or upon glazed by polishing with diamond powder.

As an alternative way, the parts were colored through a dyeing bath process in advance of performing the polish finishing.

Dye stuff was used in the ratio of 5–20 g per 1,000 cc of pure water.

The bath temperature was 60° C and the treating period was 5–10 minutes.

In most cases, in advance of the dyeing step, the parts were preferably subjected to a weak acid treatment step using, for instance, a 2.5 percent-acetic acid bath for about 1–2 minutes for improving the activation. This step promoted to convert $\gamma$-$Al_2O_3$ to $\gamma$-$Al_2O_3H_2O$.

Finally, the products were subjected to a steaming step or a hot-water treating step. In the latter case, the products were dipped in a hot pure water bath, kept at 90°–100bL C, for 30 minutes, so as to seal-off the crystal pores, and to complete the convention to $\gamma$-$Al_2O_3H_2O$.

Dyestuffs employable in this invention may be those conventionally used in the art.

For obtaining a deep black color effect, a dyeing solution of 1 liter water containing 10–20 G of ammonium molybdate and 5–10 G of $NH_4Cl$. Temperature 80° C.

For obtaining blackish red color effect, a dyeing solution of 1 liter water containing 15 G of potassium sulfate, 0.3 G of potassium bichromate and 1 gm of Alizarin. Temperature 80°–90° C.

For obtaining blackish blue color effect, a dyeing solution of 1 liter water containing 5 gms. of potassium ferrocyanide and 5 gms, of ferric chloride. Temperature 70°–80° C.

Organic dyestuffs may also be used. Recommended concentration 2.0 gms, per liter. Among others are usable, for instance, AL Red RRE (Blackish Red), AL Yellow A (Deep Yellow), AL Green, AX (Deep Green), and AL Blue GN (Deep Green).

For obtaining a deep black color effect, "AL Black BK" may be used. Concentration, 10 gms. per liter.

For obtaining a mirror finish effect, powdery Alpha-A 1203 (No. 1,000–3,000) or diamond powder is coated on a rotatable SN- or PB-Disc and the finish is performed in the wet system. Finished watch cases represent highly excellent surface finish like volcanic glass, ruby or sapphire, as the case may be depending upon the kind of dyeing step.

Several tests were carried out.

For carrying out a wear-proof test, 20 watch cases prepared according to this invention having a skin layer 30 microns thick. These cases together with 2 liters of water, were charged into a rotatable drum having an effective inside volume 15 liters, and the charged drum was rotated for 48 hours. Results were such that the initial mirror finish glaze was completely maintained. No scratch appeared and the color effect was not changed in any way.

Comparative tests were performed on stainless steel cases. Puff finish glaze was completely lost. Many scratches appeared on the surface. Original sharp edges were considerably rounded and the decorative appearance was damaged substantially.

Impact Test

A knife edge (HV 600) made of SK4(JIS) tool steel was attached to the working tip of a hammer operable to have an impact energy of 3 Kg-Cm and fitted on a sharp impact testing machine was brought in impact contact with a watch case made according to this invention and placed on the table of said machine. This impact test correspond to dropping the case from a height of 5.5 M on a hard floor. A recess having a depth of 1–2 mm was formed, but no scale-off of the skin layer was observed, thus showing a satisfactorily good tightness between the skin and the mother material.

In a comparative test on a stainless steel-made case, a slightly deeper recess (having a depth of 1.5–2 mm) was observed.

Hardness Test

Tests were made with a HV load of 200 gms. Hardness values of 450, 550, 400 and 490 were measured. With the use of an HV load of 5 gms., the surface hardness was measured as 800, 780, and 850.

Comparative tests on stainless steel cases showed hardness values of 190, 250, 213 and 218.

Atmospheric Exposure Tests

Watch cases prepared in accordance with the invention were exposed to atmosphere for 6 months. No color fade was observed, except those green-colored cases which showed a slight fading. Initial mirror finish was practially preserved. No corrosion was seen.

Salt Water Jet Exposure Tests

Ten cases were tested with jets of 5 percent NaCl solution, 35° C for a test period of 240 hours.

After the lapse of 100 hours, slight pitting was observed at the edges. However, no progress of the pitting was encountered. Even after a lapse of 240 hours, the initial mirror finish glaze was substantially preserved.

In a comparative test on stainless steel cases, red rust was observed even after a lapse of 50 hours. The rust developed gradually and after 240 hours, all the surfaces were covered with rust.

Artificial Sweat Dip Tests.

Dip solution was a 50 percent methanol/water containing per 1,000 cc thereof, NaCl 10 gm, urea 1 gm., 85 percent lactic acid 4 cc and aqueous ammonia solution 0.2 cc. Bath temperature was 20°–25° C. Dipping period extended for 30 days. Test watches were 10 in number.

Initial mirror finish was preserved even after 10 day's dip. Only one of them showed slight pitting.

In a comparative test on stainless steel cases, no alteration was observed even after lapse of 10 days.

In the meaning of the term "case", as used throughout the specification, the pusher button of a chronograph calender watch can be made of pure aluminum or aluminum alloy and provided with a skin layer of gamma-A 1203·$H_2O$. Under certain circumstances, the case may be of the one piece style wherein the middle and the bottom or rear cover are made into one piece.

What is claimed is:

1. A watch case comprising a plurality of detachable members including a supporting ring member, a middle member, and a bezel member; each of said members being comprised on a base material selected from a group consisting of a aluminum and aluminum alloys and a skin layer chemically formed thereon comprised of a fine crystalline $\gamma$-$Al_2O_3 \cdot H_2O$; said bezel member and said middle member being formed with an overlapping beveled interconnection sufficiently large to accommodate the higher coefficient of elasticity of the material of said members to prevent unintentional separation.

2. A watch case as defined in claim 1, wherein said skin surface is provided with a mirror finish.

3. A watch case as defined in claim 1, wherein said skin surface is dyed.

4. A watch case as defined in claim 1 further comprising a rear cover member of the same material as said members, said rear cover member and said middle member having a threaded connection with the crest of said thread being rounded to prevent flaking of said skin layer.

5. A watch case as defined in claim 4 wherein said skin layer on each of said members has a hardness greater than Hz400.

*6. A watch case comprising a plurality of detachable members including a middle member, a back cover and a bezel member, said middle member as the main part of said casing being comprised of a base material selected from a group consisting of aluminum and aluminum alloys and a skin layer chemically formed thereon comprised of a fine crystalline $\gamma$-$Al_2O_3H_2O$; said skin layer being dyed and provided with a mirror finish covering substantially its exposed area, said bezel and said middle member being undetachably united together.*

* * * * *